UNITED STATES PATENT OFFICE.

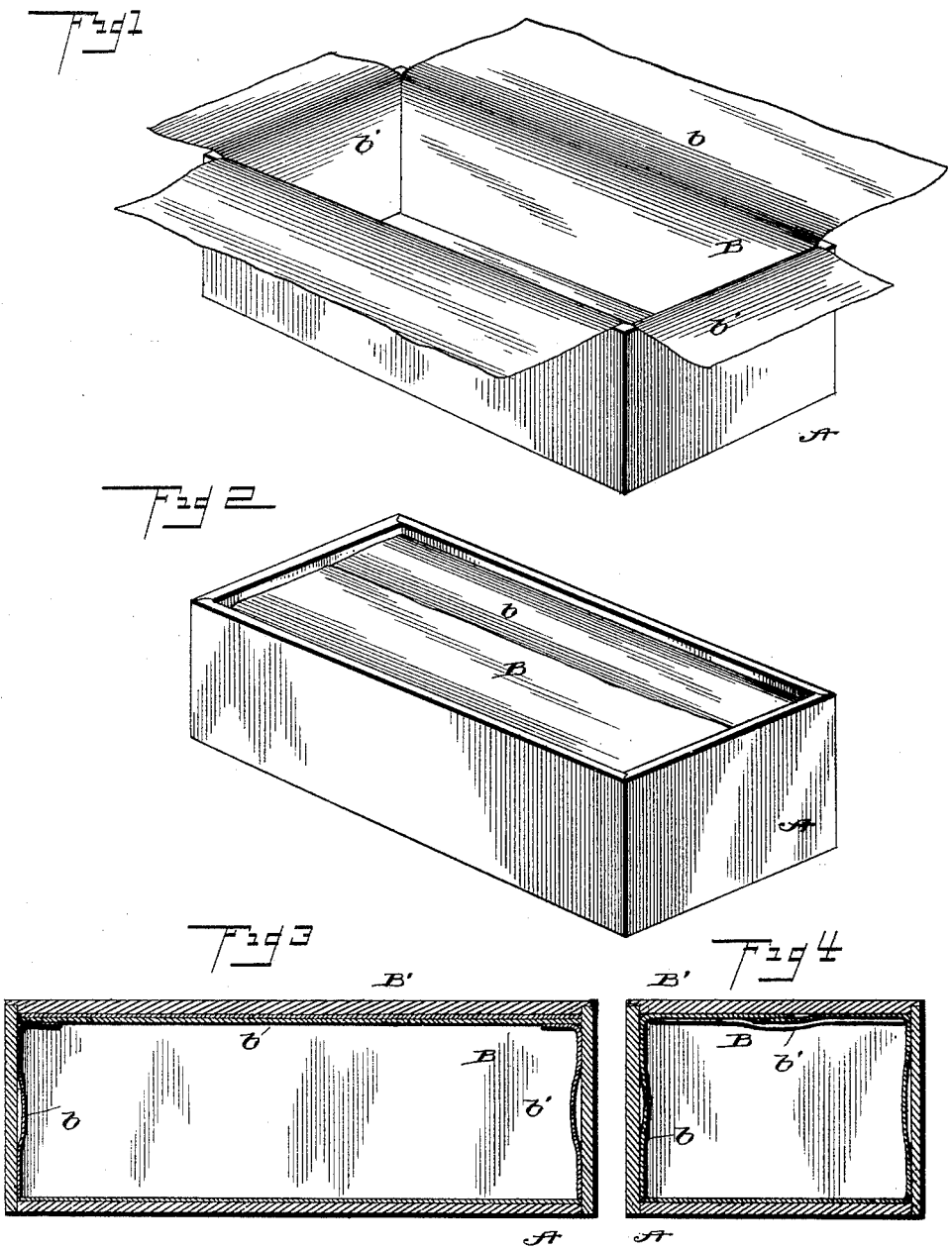

GEORGE E. DUMAS, OF WATERBURY, VERMONT.

LINING FOR BUTTER-BOXES.

SPECIFICATION forming part of Letters Patent No. 467,858, dated January 26, 1892.

Application filed April 21, 1891. Serial No. 389,773. (No model.)

*To all whom it may concern:*

Be it known that I, GEORGE E. DUMAS, residing at Waterbury, in the county of Washington and State of Vermont, have invented a new and useful Improvement in Linings for Butter-Boxes, of which the following is a specification.

The object of my invention is to provide a lining for butter-boxes which will entirely envelop the butter contained in said box and prevent the same being impregnated with the taste or smell of the wood.

With this object in view my invention consists in the peculiar construction and arrangement of the various parts, all of which will be more fully hereinafter described and claimed.

In the drawings forming a part of this specification, Figure 1 is a perspective view of a box provided with my improved lining, the lining being arranged to receive the butter to be packed. Fig. 2 is a similar view showing the lining folded over the butter. Fig. 3 is a vertical longitudinal section; and Fig. 4 is a transverse vertical section, the lining being folded upon the butter in both sections.

In the practical embodiment of my invention I employ a butter-box A, of any approved pattern and preferably rectangular in cross-section. To the inner sides and bottom of said box I secure a lining B of parchment-paper, the upper portions of said lining extending a sufficient distance above the upper edges of the sides to permit them being folded down upon the butter contained within the box, thus completely enveloping the same. This parchment lining is preferably made in three pieces $b$ and $b'\ b'$, the piece $b$ covering the bottom and opposite sides, while the pieces $b'\ b'$ cover the opposite ends, said pieces, of course, lapping somewhat at the sides and ends to prevent the butter touching the wood at those points. It will also be observed that the lining is adhesively attached to the sides and ends near the upper edges of the same, and by this means the upper ends of the lining-pieces can be folded down more neatly, and also does not interfere with the cover B' of the box.

From the above it will be seen that I provide a cheap, simple, and efficient lining—one that will prevent the butter becoming impregnated with the taste or smell of the wood and one that can be conveniently operated without inconveniencing any of the other elements of the packing-box.

Having thus described my invention, what I claim is—

1. The combination, with a butter-box, of a lining therefor formed in three pieces and comprising the piece $b$, entirely covering the bottom and sides of the box and extended a sufficient distance above the sides to adapt the flaps thus formed to overlap when folded down, and the end pieces $b'\ b'$, entirely covering the ends of the box and having short flaps projecting above said ends and adapted to overlap the side flaps, substantially as and for the purpose set forth.

2. The combination, with a butter-box, of a lining therefor consisting of a parchment piece entirely covering the bottom and sides of the box and extended above the latter in the manner and for the purpose described, and corresponding end parchment pieces entirely covering the ends of the box and extended above the same, all of said pieces being adhesively secured near the upper edges of the box, the remaining portions of the lining being loose and unsecured, substantially as and for the purpose set forth.

In testimony whereof I affix my signature in presence of two witnesses.

GEO. E. DUMAS.

Witnesses:
W. J. BOYER,
JERRY LYMAN.